(12) United States Patent
Haynes

(10) Patent No.: US 10,817,510 B1
(45) Date of Patent: Oct. 27, 2020

(54) SYSTEMS AND METHODS FOR NAVIGATING THROUGH A HIERARCHY OF NODES STORED IN A DATABASE

(71) Applicant: Veritas Technologies LLC, Santa Clara, CA (US)

(72) Inventor: Tim Haynes, Berkshire (GB)

(73) Assignee: Veritas Technologies LLC, Santa Clara, CA (US)

(*) Notice: Subject to any disclaimer, the term of this patent is extended or adjusted under 35 U.S.C. 154(b) by 497 days.

(21) Appl. No.: 14/480,558

(22) Filed: Sep. 8, 2014

Related U.S. Application Data

(60) Provisional application No. 61/988,215, filed on May 4, 2014.

(51) Int. Cl.
  *G06F 16/00* (2019.01)
  *G06F 16/2453* (2019.01)

(52) U.S. Cl.
  CPC .............................. *G06F 16/2453* (2019.01)

(58) Field of Classification Search
  None
  See application file for complete search history.

(56) References Cited

U.S. PATENT DOCUMENTS

| | | | |
|---|---|---|---|
| 5,832,470 A | 11/1998 | Morita | |
| 5,850,547 A | 12/1998 | Waddington et al. | |
| 5,946,692 A | 8/1999 | Faloutsos | |
| 5,991,754 A | 11/1999 | Raitto et al. | |
| 6,009,432 A | 12/1999 | Tarin | |
| 6,205,451 B1 | 3/2001 | Norcott et al. | |
| 6,216,134 B1 | 4/2001 | Heckerman | |

(Continued)

FOREIGN PATENT DOCUMENTS

| AU | 2002334721 B2 * | 10/2008 | ........... G06F 16/284 |
|---|---|---|---|
| AU | 2015256400 B2 | 12/2017 | |

(Continued)

OTHER PUBLICATIONS

Ynn-Pyng Anker Tsaur; Systems and Methods for Securely Storing Backup Data While Facilitating Fast Failovers; U.S. Appl. No. 13/656,536; filed Oct. 19, 2012.

(Continued)

*Primary Examiner* — Etienne P Leroux
*Assistant Examiner* — Farhad Agharahimi
(74) *Attorney, Agent, or Firm* — FisherBroyles, LLP

(57) ABSTRACT

The disclosed computer-implemented method for navigating through a hierarchy of nodes stored in a database may include (1) receiving a request to access a database that stores a set of nodes organized in a hierarchy, wherein the hierarchy is divided into contiguous subsections and each subsection is stored in a separate page and (2) in response to the request, traversing a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the one or more subsequent nodes in the path by accessing the page loaded into local memory instead of accessing the database. Additional methods, systems, and computer-readable media are also disclosed.

20 Claims, 7 Drawing Sheets

(56) References Cited

U.S. PATENT DOCUMENTS

| | | | |
|---|---|---|---|
| 6,334,128 B1 | 12/2001 | Norcott et al. | |
| 6,345,272 B1 | 2/2002 | Witkowski et al. | |
| 6,356,902 B1 * | 3/2002 | Tan | G06F 16/40 |
| 6,446,061 B1 | 9/2002 | Doerre et al. | |
| 6,477,525 B1 | 11/2002 | Bello et al. | |
| 6,484,159 B1 | 11/2002 | Mumick et al. | |
| 6,496,819 B1 | 12/2002 | Bello et al. | |
| 6,594,653 B2 | 7/2003 | Colby et al. | |
| 6,606,626 B1 * | 8/2003 | Ponnekanti | G06F 16/2308 |
| 6,658,413 B1 | 12/2003 | Reddy et al. | |
| 6,763,352 B2 | 7/2004 | Cochrane et al. | |
| 6,882,993 B1 | 4/2005 | Lawande et al. | |
| 6,915,289 B1 | 7/2005 | Malloy | |
| 6,922,696 B1 | 7/2005 | Lincoln | |
| 7,100,195 B1 | 8/2006 | Underwood | |
| 7,158,994 B1 | 1/2007 | Smith et al. | |
| 7,392,248 B2 | 6/2008 | Bakalash | |
| 7,428,220 B1 | 9/2008 | Caronni et al. | |
| 7,516,412 B1 | 4/2009 | De Waal | |
| 7,610,285 B1 | 10/2009 | Zoellner | |
| 8,364,720 B2 | 1/2013 | Levy | |
| 8,417,715 B1 | 4/2013 | Bruckhaus | |
| 8,458,186 B2 | 6/2013 | Stringham et al. | |
| 8,478,742 B2 | 7/2013 | Folkert et al. | |
| 8,494,894 B2 | 7/2013 | Jaster | |
| 8,533,176 B2 | 9/2013 | Pandey | |
| 8,589,447 B1 | 11/2013 | Grunwald | |
| 8,682,886 B2 | 3/2014 | Sorkin et al. | |
| 8,737,683 B2 | 5/2014 | Kirmse et al. | |
| 8,755,837 B2 | 6/2014 | Rhoads | |
| 8,918,388 B1 | 12/2014 | Chen | |
| 9,268,849 B2 | 2/2016 | Siedlecki | |
| 9,311,326 B2 | 4/2016 | Goyen | |
| 9,578,171 B2 | 2/2017 | Barinov | |
| 10,025,804 B2 | 7/2018 | Vranyes et al. | |
| 10,073,864 B1 | 9/2018 | Koeten et al. | |
| 10,078,668 B1 | 9/2018 | Woodrow et al. | |
| 10,095,768 B2 | 10/2018 | Koeten | |
| 2001/0037324 A1 | 11/2001 | Agrawal et al. | |
| 2001/0039544 A1 | 11/2001 | Chakrabarti et al. | |
| 2002/0010708 A1 | 1/2002 | McIntosh | |
| 2002/0055942 A1 | 5/2002 | Reynolds | |
| 2002/0069102 A1 | 6/2002 | Vellante et al. | |
| 2003/0028509 A1 | 2/2003 | Sah | |
| 2003/0145277 A1 | 7/2003 | Neal et al. | |
| 2003/0200221 A1 | 10/2003 | Bakalash et al. | |
| 2004/0010493 A1 | 1/2004 | Kojima | |
| 2004/0128289 A1 | 7/2004 | Cochrane et al. | |
| 2004/0215626 A1 | 10/2004 | Colossi | |
| 2005/0038805 A1 | 2/2005 | Maren | |
| 2005/0102195 A1 | 5/2005 | Kuehr-McLaren | |
| 2005/0235004 A1 | 10/2005 | Folkert et al. | |
| 2006/0106782 A1 | 5/2006 | Blumenau | |
| 2006/0122964 A1 | 6/2006 | Yu et al. | |
| 2006/0265427 A1 | 11/2006 | Cohen | |
| 2007/0112783 A1 | 5/2007 | McCreight | |
| 2007/0244892 A1 | 10/2007 | Narancic | |
| 2008/0071908 A1 | 3/2008 | Nair et al. | |
| 2008/0077852 A1 | 3/2008 | Fleishman | |
| 2008/0091641 A1 | 4/2008 | Barua | |
| 2008/0235077 A1 | 9/2008 | Harkness et al. | |
| 2008/0306947 A1 | 12/2008 | Kolesnikov | |
| 2009/0019005 A1 | 1/2009 | Hu et al. | |
| 2009/0024561 A1 | 1/2009 | Palanisamy | |
| 2009/0043825 A1 | 2/2009 | Bourne | |
| 2009/0049040 A1 | 2/2009 | Fay et al. | |
| 2009/0063419 A1 | 3/2009 | Nurminen | |
| 2009/0064160 A1 | 3/2009 | Larson et al. | |
| 2009/0125828 A1 | 5/2009 | Fried et al. | |
| 2009/0182779 A1 | 7/2009 | Johnson | |
| 2009/0276393 A1 | 11/2009 | Bestgen et al. | |
| 2009/0319546 A1 * | 12/2009 | Shaik | G06F 16/258 |
| 2010/0017363 A1 | 1/2010 | Bellamkonda et al. | |
| 2010/0042615 A1 | 2/2010 | Rinearson | |
| 2010/0088317 A1 | 4/2010 | Bone et al. | |
| 2010/0146004 A1 | 6/2010 | Sim-Tang et al. | |
| 2010/0274750 A1 | 10/2010 | Oltean et al. | |
| 2010/0333116 A1 | 12/2010 | Prahlad | |
| 2011/0040773 A1 | 2/2011 | Danesi | |
| 2011/0113466 A1 | 5/2011 | Stringham et al. | |
| 2011/0131628 A1 | 6/2011 | Pfitzmann | |
| 2011/0145217 A1 | 6/2011 | Maunder | |
| 2011/0225125 A1 | 9/2011 | Colgrave | |
| 2011/0227754 A1 | 9/2011 | Hill | |
| 2011/0276607 A1 | 11/2011 | Surna et al. | |
| 2011/0320480 A1 | 12/2011 | Kisin | |
| 2012/0047483 A1 | 2/2012 | Amit | |
| 2012/0198073 A1 | 8/2012 | Srikanth | |
| 2013/0013650 A1 | 1/2013 | Shum | |
| 2013/0054731 A1 | 2/2013 | Branton | |
| 2013/0166543 A1 | 6/2013 | MacDonald | |
| 2013/0204886 A1 | 8/2013 | Faith et al. | |
| 2013/0311509 A1 | 11/2013 | Sorkin et al. | |
| 2013/0332487 A1 | 12/2013 | Ramesh et al. | |
| 2014/0006244 A1 | 1/2014 | Crowley et al. | |
| 2014/0032617 A1 | 1/2014 | Stanfill | |
| 2014/0052689 A1 | 2/2014 | Ficara et al. | |
| 2014/0068706 A1 | 3/2014 | Aissi | |
| 2014/0081890 A1 | 3/2014 | Casiano | |
| 2014/0089246 A1 | 3/2014 | Adriaansen | |
| 2014/0098101 A1 * | 4/2014 | Friedlander | G06T 11/206 345/440 |
| 2014/0101124 A1 | 4/2014 | Scriffignano | |
| 2014/0114916 A1 | 4/2014 | Szabo et al. | |
| 2014/0122439 A1 | 5/2014 | Faerber | |
| 2014/0143294 A1 | 5/2014 | Vitaly | |
| 2014/0181052 A1 | 6/2014 | Moore et al. | |
| 2014/0244662 A1 | 8/2014 | Mo | |
| 2014/0294169 A1 | 10/2014 | Barinov | |
| 2015/0088812 A1 | 3/2015 | Ziauddin et al. | |
| 2015/0095430 A1 | 4/2015 | Kaushik et al. | |
| 2015/0193477 A1 | 7/2015 | Dumant et al. | |
| 2015/0286697 A1 | 10/2015 | Byrne | |
| 2015/0302205 A1 | 10/2015 | Milman et al. | |
| 2015/0304169 A1 | 10/2015 | Milman | |
| 2015/0317339 A1 | 11/2015 | Vranyes et al. | |
| 2015/0347773 A1 | 12/2015 | Bonney et al. | |
| 2016/0306897 A1 * | 10/2016 | Huang | G06F 16/9024 |

FOREIGN PATENT DOCUMENTS

| | | | |
|---|---|---|---|
| AU | 2015346655 B2 | 1/2019 | |
| CA | 2 955 257 A1 | 11/2015 | |
| CN | 101616090 A * | 12/2009 | |
| CN | 101616090 A * | 12/2009 | |
| CN | 102414677 A | 4/2012 | |
| CN | 107209765 A | 9/2017 | |
| EP | 0977128 A1 * | 2/2000 | G06F 16/9027 |
| EP | 3 140 787 A1 | 3/2017 | |
| EP | 3 218 824 A1 | 9/2017 | |
| JP | H11213014 A | 8/1999 | |
| JP | 2004007508 A | 1/2004 | |
| JP | 2005018754 A | 1/2005 | |
| JP | 2008158993 A | 7/2008 | |
| JP | 2012504280 A | 2/2012 | |
| JP | 6336675 B2 | 6/2018 | |
| WO | 03/030032 A2 | 4/2003 | |
| WO | WO2015055502 A2 * | 10/2013 | G06F 17/30445 |
| WO | WO 2015/055502 A1 | 4/2015 | |
| WO | WO-2015055502 A2 * | 4/2015 | G06F 16/24532 |
| WO | WO 2015055502 A2 * | 4/2015 | G06F 17/30445 |
| WO | 2015/171434 A1 | 11/2015 | |
| WO | 2016/077230 A1 | 5/2016 | |

OTHER PUBLICATIONS

Carey Nachenberg; Systems and Methods for Detecting Malicious Files; U.S. Appl. No. 13/715,265, filed Dec. 14, 2012.

Sudhakar Paulzagade, et al; Systems and Methods for Modifying Track Logs During Restore Processes; U.S. Appl. No. 14/283,742, filed May 21, 2014.

(56) References Cited

OTHER PUBLICATIONS

Lagoze, Carl et al., "Metadata aggregation and "automated digital libraries": A retrospective on the NSDL experience", http://arxiv.org/ftp/cs/papers/0601/0601125.pdf, as accessed May 1, 2014, (2006).
Steve A. Vranyes, et al; Systems and Methods for Aggregating Information—Asset Metadata from Multiple Disparate Data—Management Systems; U.S. Appl. No. 14/483,133, filed Sep. 10, 2014.
Karl Woodrow, et al; Systems and Methods for Utilizing Information—Asset Metadata Aggregated from Multiple Disparate Data—Management Systems; U.S. Appl. No. 14/483,136, filed Sep. 10, 2014.
"IF4IT, The International Foundation for Information Technology", http://www.if4it.com/SYNTHESIZED/DISCIPLINES/Information_Asset_Management_Home_Page.html, as accessed May 1, 2014, (2009).
Soares, Sunil "Big Data Governance", http://dama-ny.com/images/meeting/101713/Presentation_deck/damanyc_bigdatagovernance17_october_2013.pdf, as accessed May 1, 2014, Information Asset, LLC, (Oct. 17, 2013).
"IAPMS (Information Asset Portfolio Management System)", http://www.iapms-home.com/, as accessed May 1, 2014, (2012).
"Streamline E-Discovery Collections Management Process", http://falcondiscovery.com/resources/case-studies/streamline-ediscovery-collections-management-process-2/, as accessed May 1, 2014, Falcon Discovery, (Oct. 6, 2011).
"ediscovery.com", http://www.ediscovery.com/eu/solutions/collect/, as accessed May 1, 2014, Kroll Ontrack Inc.,(2014).
"Corporations Optimize Cost-effective E-discovery", http://www.hds.com/assets/pdf/hitachi-corporations-optimize-cost-effective-e-discovery.pdf, as accessed May 1, 2014, Solution Profile, Hitachi Data Systems Corporation, (Jan. 2012).
"Optimizing Resources for Efficient eDiscovery", http://www.novitex.com/pdfs/white-papers/White-Paper_Legal_Efficient%20eDiscovery_PBMS00101.pdf, as accessed May 1, 2014, White Paper, Pitney Bowes Inc., (2012).
"HP Autonomy", http://www.autonomy.com/, as accessed May 1, 2014, Hewlett-Packard, (Oct. 29, 1996).
"CommVault® Simpana Software", http://www.commvault.com/simpana-software, as accessed May 1, 2014, (Jul. 5, 2012).
"Proofpoint", http://www.proofpoint.com/, as accessed May 1, 2014, (Nov. 28, 2001).
"Nuix", http://www.nuix.com/, as accessed May 1, 2014, (Jan. 7, 2007).
"Varonis", http://www.varonis.com/, as accessed May 1, 2014, (Aug. 31, 2004).
"InfoSphere Platform", http://www-01.ibm.com/software/data/infosphere/, as accessed May 1, 2014, IBM, (Jan. 8, 2009).
"Acaveo", http://www.acaveo.com/, as accessed May 1, 2014, (Feb. 2, 2011).
"ZyLAB", http://www.zylab.com/, as accessed May 1, 2014, (Dec. 29, 1996).
"Imperva", http://www.imperva.com/, as accessed May 1, 2014, (Feb. 16, 2004).
"NTP Software", http://www.ntpsoftware.com/, as accessed May 1, 2014, (Dec. 20, 1996).
"APTARE", http://www.aptare.com/, as accessed May 1, 2014, (1993).
"TITUS", http://www.titus.com/, as accessed May 1, 2014, (Dec. 7, 1998).
"Index Engines", http://www.indexengines.com/, as accessed May 1, 2014, (Mar. 20, 2004).
"Duplicate Image Finder", http://www.alldup.de/delete_duplicate_files/duplicate_image_finder.htm, as accessed May 1, 2014, AllDup, Michael Thummerer Software Design, (2000).
V.Laurie, "Best Free Duplicate File Remover", http://www.techsupportalert.com/best-free-duplicate-file-remover.htm, as accessed May 1, 2014, (Jul. 4, 2014).
"CloneSpy", http://www.clonespy.com/, as accessed May 1, 2014, (Aug. 5, 2001).
"Symantec Data Insight", http://www.symantec.com/data-insight, as accessed May 1, 2014, Symantec Corporation, (1995).
Alok Dwivedi, et al; Systems and Methods for Automatically Translating Data Records; U.S. Appl. No. 14/540,171, filed Nov. 13, 2014.
Robert Koeten; Systems and Methods for Aggregating Information—Asset Classifications; U.S. Appl. No. 14/542,165, filed Nov. 14, 2014.
"BigQuery in Practice: Loading Data Sets That are Terabytes and Beyond", https://cloud.google.com/developers/articles/bigquery-in-practice/, as accessed May 1, 2014, (Feb. 27, 2014).
Stockinger, Kurt et al., "Query-Driven Visualization of Large Data Sets", http://www.researchgate.net/publication/200084949_Query-Driven_Visualization_of_Large_Data_Sets, as accessed May 1, 2014, Visualization, 2005, VIS 05, IEEE, (2005).
"Apache Spark—Fast Big Data Analytics Engine", https://bighadoop.wordpress.com/2014/04/03/apache-spark-a-fast-big-data-analytics-engine/, as accessed May 1, 2014, (Apr. 3, 2014).
Robert Koeten, et al; Systems and Methods for Automated Aggregation of Information—Source Metadata; U.S. Appl. No. 14/561,244, filed Dec. 5, 2014.
"Improving Database Query Performance", http://kb.tableausoftware.com/articles/knowledgebase/database-query-performance, as accessed May 1, 2014, (Dec. 19, 2011).
"Collaborative filtering", http://en.wikipedia.org/wiki/Collaborative_filtering, as accessed May 1, 2014, Wikipedia, (Apr. 27, 2004).
Keyser, Chris "Optimizing for Star Schemas on Amazon Redshift", http://aws.amazon.com/articles/8341516668711341, as accessed May 1, 2014, Amazon Web Services, Inc., (Dec. 31, 2013).
Aeham Abushwashi; Systems and Methods for Maintaining Aggregate Tables in Databases; U.S. Appl. No. 14/447,619, filed Jul. 31, 2014.
Tim Haynes, et al; Systems and Methods for Organizing Multi-Faceted Sets of Data; U.S. Appl. No. 14/480,560, filed Sep. 8, 2014.
"SQL", http://en.wikipedia.org/wiki/Sql, as accessed May 1, 2014, Wikipedia, (Jan. 1, 2004).
"Relational database management system", http://en.wikipedia.org/wiki/Relational_database_management_system, as accessed May 1, 2014, Wikipedia, (Dec. 18, 2003).
"The four categories of NoSQL databases", http://rebelic.nl/2011/05/28/the-four-categories-of-nosql-databases/, as accessed May 1, 2014, (Aug. 2, 2013).
Michael Main, et al., Data Structures & Other Objects Using C++, 2nd Edition, Addison Wesley, Boston, MA, 2001, pp. 91-92.
CommVault Simpana Software; http://www.commvault.com/simpana-software, as accessed May 1, 2014.
Apache Spark, a Fast Big Data Analytics Engine; https://bighadoop.wordpress.com/2014/04/03/apache-spark-a-fast-big-data-analytics-engine/, as accessed May 1, 2014.
Dourish, Paul, et al., "Extending Document Management Systems with User-Specific Active Properties", ACM Transactions on Information Systems, vol. 18, No. 2, Apr. 2000, pp. 140-170.
Microsoft Computer Dictionary, 5th Edition, Microsoft Press, Redmond, WA, 2002, pp. 67-68.
Random House Webster's College Dictionary, Random House, New York, NY, Apr. 2000, pp. 25 and 1429.
U.S. Appl. No. 61/805,513, filed Mar. 26, 2013, Barinov.
Millen, Jonathan K., et al., "Security for Object-Oriented Database Systems", RISP 1992, Oakland, CA, Aug. 6, 1992, pp. 260-272.
Wikipedia, "Fingerprint (computing)", URL: https://en.wikipedia.org/w/index.php?title=Fingerprint_(computing)&oldid=571160717, Sep. 2, 2013, pp. 1-4.
Barinov, Vitaly Y., "Low Latency Distributed Aggregation for Contact Center Agent-Groups on Sliding Interval", U.S. Appl. No. 61/805,513, filed Mar. 26, 2013, 84 pages.
International Search Report and Written Opinion received for PCT Application Serial No. PCT/US2015/028669 dated Jul. 22, 2015, 11 pages.
International Preliminary Report on Patentability received for PCT Application Serial No. PCT/US2015/028669 dated Nov. 17, 2016, 9 pages.

(56) References Cited

OTHER PUBLICATIONS

International Search Report and Written Opinion received for PCT Application Serial No. PCT/US2015/059744 dated Feb. 5, 2016, 12 pages.
International Preliminary Report on Patentability received for PCT Application Serial No. PCT/US2015/059744 dated May 26, 2017, 11 pages.

\* cited by examiner

Lookup Table
500

| Primary Key | Page Key |
|---|---|
| 1 | 1 |
| 2 | 1 |
| 3 | 2 |
| 4 | 2 |
| 5 | 2 |
| 6 | 1 |
| 7 | 3 |
| 8 | 3 |
| 9 | 3 |

Page Table
502

| Page Key | Parent Node Primary Key | Nodes in Page |
|---|---|---|
| 1 | | A → B, A → F |
| 2 | 1 | C → D, C → E |
| 3 | 6 | G → H, G → I |

*FIG. 5*

SYSTEMS AND METHODS FOR NAVIGATING THROUGH A HIERARCHY OF NODES STORED IN A DATABASE

CROSS REFERENCE TO RELATED APPLICATION

This application claims priority to U.S. Application No. 61/988,215, filed on 4 May 2014 and titled Maintaining Metadata Aggregations in Multiple Tables for Accurate and Fast Searching in a Not Only Structured Query Language (NoSQL) Database, the disclosure of which is incorporated, in its entirety, by this reference.

BACKGROUND

Databases may be used to store and manipulate large sets of related data (e.g., data that is organized in a hierarchy). For example, relational databases (e.g., Structured Query Language (SQL) databases) may store structured sets of data or nodes, as well as information that identifies connections between the nodes. In some cases, a storage system may attempt to identify a particular node or set of nodes within a database by traversing a path through the set of nodes. Traversing a path through a set of nodes may include stepping through a sequence of subsequent parent, child, or sibling nodes. In some cases, identifying each subsequent node in the path may involve separate accesses to the server that stores the database, incurring delays and consuming computing resources. As such, some databases may implement a variety of techniques to increase the efficiency of traversing a path through a set of nodes. For example, a database may implement stored procedures (e.g., sets of logic) that perform certain tasks within the server that stores the database.

Unfortunately, traditional approaches for navigating through a set of connected nodes may be unavailable or impractical for non-relational databases (e.g., NoSQL databases) and/or databases stored across multiple servers. For example, non-relational databases may not support stored procedures. In addition, the benefits of stored procedures may be diminished in large databases that are distributed across multiple servers. As such, the current disclosure identifies and addresses a need for additional and improved systems and methods for navigating through hierarchies of nodes stored in databases.

SUMMARY

As will be described in greater detail below, the instant disclosure describes various systems and methods for navigating through a hierarchy of nodes stored in a database by storing contiguous subsections of nodes in separate pages and loading one or more pages into local memory. Multiple nodes within a path may then be accessed via local memory.

In one example, a computer-implemented method for navigating through a hierarchy of nodes stored in a database may include (1) receiving a request to access a database that stores a set of nodes organized in a hierarchy, where the hierarchy is divided into contiguous subsections and each subsection is stored in a separate page and (2) in response to the request, traversing a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the subsequent nodes in the path by accessing the page loaded into local memory instead of accessing the database. In some embodiments, the path may include nodes distributed across multiple servers.

In some examples, the method may further include dividing the hierarchy of nodes into contiguous subsections by allocating a number of nodes to each subsection based on the total number of nodes within the hierarchy of nodes. Additionally or alternatively, the method may include allocating the number of nodes to each subsection based on the amount of time required to load a page into local memory. In additional examples, the method may include allocating the number of nodes to each subsection based on the frequency with which nodes within the hierarchy of nodes are modified.

In some embodiments, each node within the hierarchy of nodes may represent a child node descended from a parent node, a parent node with at least one child node, and/or a root node that represents the highest parent node on a path within a page. Additionally, in some embodiments, each node within the hierarchy of nodes may be uniquely identified by a primary key, and each page that stores a subsection of nodes may be uniquely identified by a page key.

In some examples, while traversing the path through the hierarchy of nodes, the method may further include determining that the subsequent node in the path is stored on a subsequent page. In these examples, the method may further include navigating to the subsequent node by loading the subsequent page into local memory and accessing the subsequent node via local memory. In some embodiments, traversing the path through the hierarchy of nodes may include traversing a path down the hierarchy of nodes. In such embodiments, each parent node that has a child node on a separate page may store the page key of the page that stores the child node. In these embodiments, loading the subsequent page into local memory may include identifying the page key of the subsequent page within the lowest node on the path within the initial page.

In other embodiments, traversing the path through the hierarchy of nodes may include traversing a path up the hierarchy of nodes. In some embodiments, loading the subsequent page into local memory may include identifying the primary key of the subsequent node within a page table that, for each page, stores the primary key of the parent node of the root node of the page. The method may then include using the primary key of the subsequent node to look up the page key of the subsequent page. In other embodiments, the method may include storing the page key of the subsequent page within the initial page. In such embodiments, when traversing a path up the hierarchy of nodes, loading the subsequent page into memory may include directly identifying the page key of the subsequent page within the initial page.

In some examples, the method may further include caching both the initial page and the subsequent page in local memory after loading the subsequent page into local memory. Additionally or alternatively, loading the page from the database into local memory may include loading the initial page and preloading at least one additional page that potentially stores nodes within the path into local memory.

In some embodiments, after storing a subsection of nodes in a page, the method may further include adding additional nodes to the page until the number of nodes within the page reaches a predetermined threshold. In response to the number of nodes reaching the predetermined threshold, the method may include separating the page into two pages that each contain a contiguous subsection of nodes.

In one embodiment, a system for implementing the above-described method may include (1) a receiving module that receives a request to access a database that stores a set of nodes organized in a hierarchy, wherein the hierarchy is divided into contiguous subsections and each subsection is stored in a separate page and (2) a traversing module that, in response to the request, traverses a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the subsequent nodes in the path by accessing the page loaded into local memory instead of accessing the database. In addition, the system may include at least one processor that executes the receiving module and the traversing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to access a database that stores a set of nodes organized in a hierarchy, wherein the hierarchy is divided into contiguous subsections and each subsection is stored in a separate page and (2) in response to the request, traverse a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the subsequent nodes in the path by accessing the page loaded into local memory instead of accessing the database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary lookup table and an exemplary page table.

Figure 1:
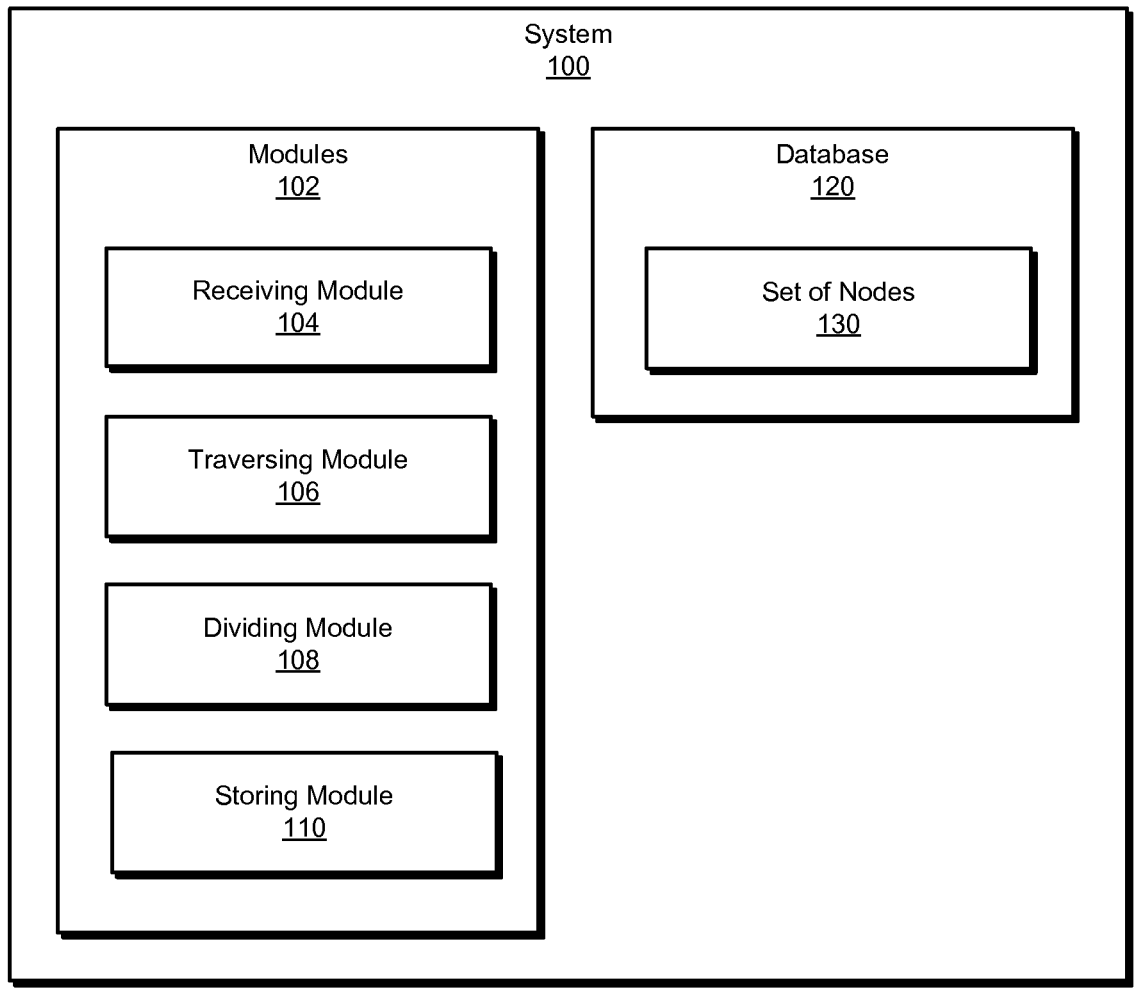
FIG. 1 is a block diagram of an exemplary system for navigating through a hierarchy of nodes stored in a database.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for navigating through a hierarchy of nodes stored in a database. As will be explained in greater detail below, by loading sections of a hierarchy of nodes from a database into local memory, the systems and methods described herein may quickly and efficiently access multiple nodes within local memory, rather than individually accessing each subsequent node from a server (or servers) that stores the database. As such, the disclosed systems and methods may reduce the time and computing resources involved in traversing a path through a set of nodes.

Figure 2:
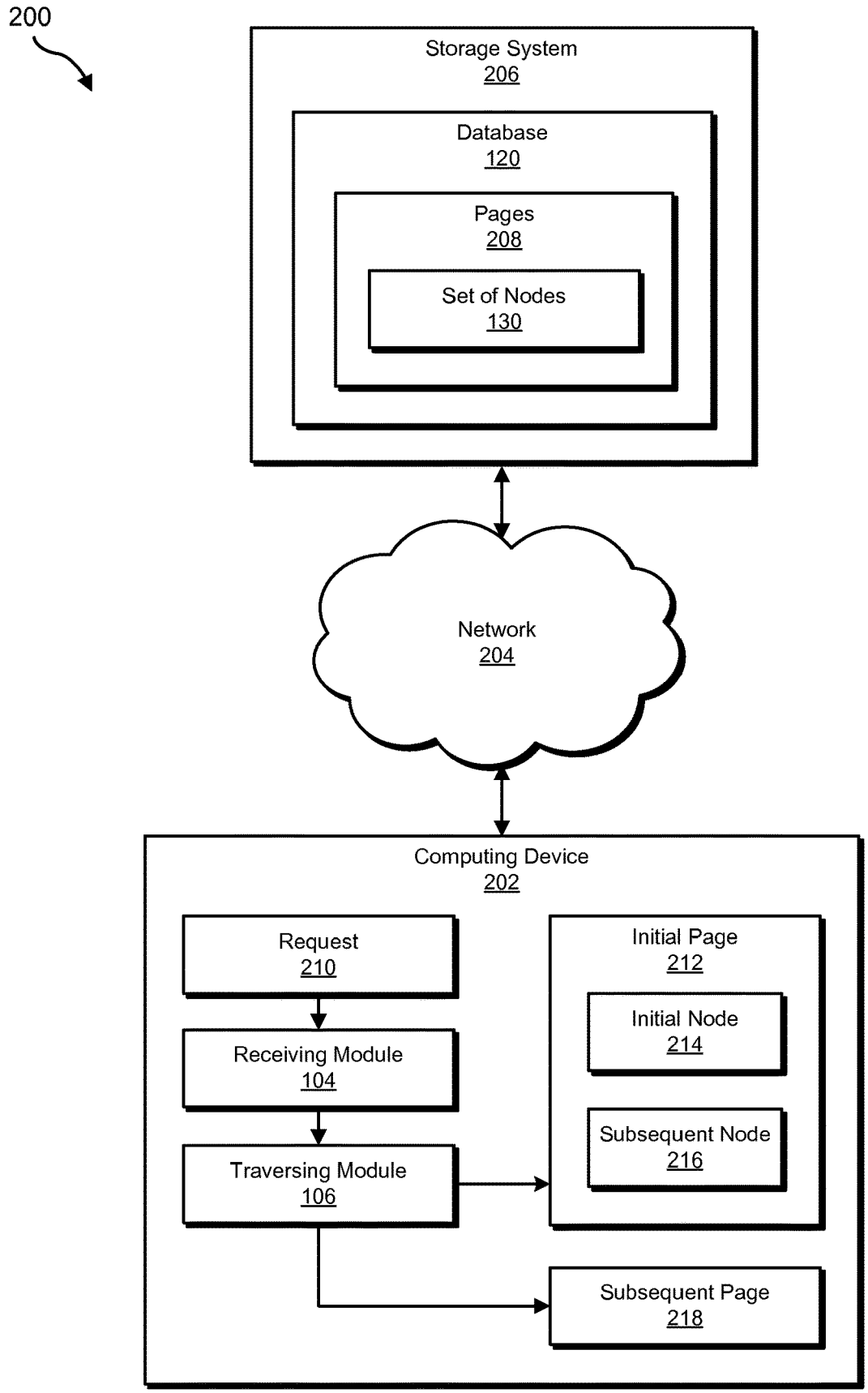
FIG. 2 is a block diagram of an additional exemplary system for navigating through a hierarchy of nodes stored in a database.

The following will provide, with reference to FIGS. 1 and 2, detailed descriptions of exemplary systems for navigating through a hierarchy of nodes stored in a database. Detailed descriptions of corresponding computer-implemented methods will also be provided in connection with FIG. 3. In addition, detailed descriptions of hierarchies of nodes separated into pages will be provided in connection with FIG. 4. Furthermore, detailed descriptions of lookup tables and page tables used to identify pages of nodes will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for navigating through a hierarchy of nodes stored in a database. As illustrated in this figure, exemplary system 100 may include one or more modules 102 for performing one or more tasks. For example, and as will be explained in greater detail below, exemplary system 100 may include a receiving module 104 that receives a request to access a database that stores a hierarchy of nodes that is divided into contiguous subsections, the database storing each subsection in a separate page. Exemplary system 100 may also include a traversing module 106 that, in response to the request, traverses a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the subsequent nodes in the path by accessing the page loaded into local memory instead of accessing the database.

In addition, and as will be described in greater detail below, exemplary system 100 may include a dividing module 108 that divides the hierarchy of nodes into contiguous subsections by allocating a number of nodes to each subsection. Finally, exemplary system 100 may include a storing module that stores a page key of a subsequent page within the initial page. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. Database 120 may represent any type or form of database configured to store a set of data entries or nodes. In some examples, database 120 may store a set of related nodes as well as information about how the nodes are related. For example, database 120 may store a set of nodes 130 that are organized in a hierarchy (e.g., each node within the set of nodes may represent a child node descended from a parent node and/or a parent node with at least one child node). In some examples, database 120 may identify the value of each node by assigning the node a unique identifier (e.g., a primary key). The term "primary key," as used herein, generally refers to any type or form of label, identification, or portion of data that is associated with a node and that is unique within a set of nodes. Primary keys may be represented by numbers, letters, words, special characters, and/or combinations of one or more of the same. In some embodiments, database 120 may store associations between each node and each parent and/or child node related to the node (e.g., by storing the primary key of the related node within the node).

In some examples, database 120 may represent a relational database (e.g., a SQL database) that stores structured sets of nodes using tabular relations. In other examples, database 120 may represent a non-relational database, such as a NoSQL database (e.g., a key-value database, a column family database, a document database, a graph database, etc.). Examples of database 120 include, without limitation, ORACLE BDB databases, CASSANDRA databases, MONGODB databases, INFOGRID databases, and/or any other type of database.

As noted, database 120 may store set of nodes 130 in FIG. 1. Set of nodes 130 may represent any group or cluster of data entries whose values are related to or associated with one another. For example, set of nodes 130 may represent connections within social networking services, clusters of attributes associated with employees or customers, geographic subdivisions, and/or any additional set of interconnected data. In some examples, database 120 may store set of nodes 130 in a single server or computing system. In other examples, database 120 may store set of nodes 130 across multiple servers and/or computing systems (e.g., as part of an APACHE CASSANDRA storage system). In addition, set of nodes 130 may be organized into a single hierarchy, or set of nodes 130 may contain multiple hierarchies.

Furthermore, in some examples, the systems described herein may manage and/or maintain set of nodes 130 within database 120. For example, one or more of modules 102 may be responsible for and/or be given access to add, delete, or otherwise modify set of nodes 130 within database 120. However, in other examples, set of nodes 130 may be managed and/or maintained within database 120 by an external service or entity. In these examples, one or more of modules 102 may be granted access to database 120 in order to navigate through set of nodes 130.

Database 120 may represent portions of a single database or computing device or a plurality of databases or computing devices. For example, database 120 may represent a portion of storage system 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as storage system 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204. In the example shown in FIG. 2, computing device 202 may be programmed with modules 102 and may access and/or analyze database 120 stored in storage system 206. In another example, storage system 206 may be programmed with one or more of modules 102 in addition to storing all or a portion of database 120.

In one embodiment, one or more of modules 102 from FIG. 1 may, when executed by at least one processor of computing device 202 and/or storage system 206, enable computing device 202 and/or storage system 206 to navigate through a hierarchy of nodes stored in a database. For example, and as will be described in greater detail below, receiving module 104 may cause computing device 202 and/or storage system 206 to receive a request (e.g., request 210) to access a database (e.g., database 120) that stores a hierarchy of nodes (e.g., set of nodes 130) that is divided into contiguous subsections. Database 120 may store each subsection in a separate page (e.g., pages 208). In addition, traversing module 106 may cause computing device 202 and/or storage system 206 to, in response to request 210, traverse a path through set of nodes 130 by (a) identifying an initial node (e.g., initial node 214) in the path and looking up an initial page (e.g., initial page 212) that contains initial node 214, (b) loading initial page 212 from database 120 into local memory (i.e., the page including initial node 214 and one or more subsequent nodes in the path, such as subsequent node 216), and (c) navigating to subsequent node 216 by accessing initial page 212 via local memory instead of accessing database 120.

Computing device 202 generally represents any type or form of computing device capable of reading computer-executable instructions. In some examples, computing device 202 may be capable of accessing a section of nodes stored in a database and loading the section of nodes into cache or local memory. The term "local memory," as used herein, generally refers to any type or form of memory located on a computing device that is traversing a path through a hierarchy of nodes. In some examples, local memory may refer to a portion of memory within a computing device that is dedicated to a single program, application, processor or service executing on the computing device. Additionally, in some embodiments, local memory may represent a portion of fast-access memory (e.g., a cache or RAM) designed to minimize the time required to access stored data. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Storage system 206 generally represents any type or form of computing device that is capable of hosting all or a portion of database 120 and/or set of nodes 130. Examples of storage system 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and storage system 206.

Figure 3:
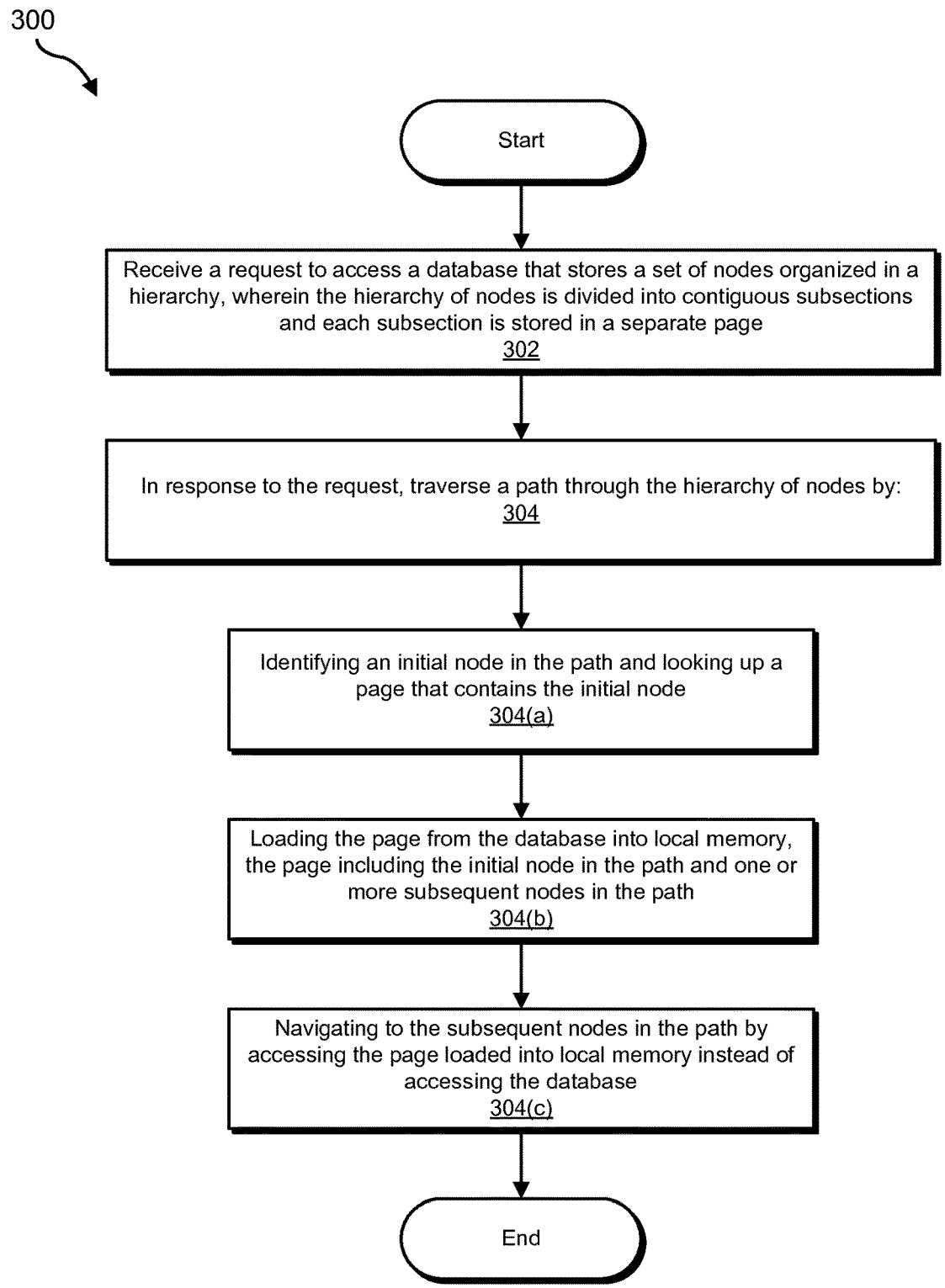
FIG. 3 is a flow diagram of an exemplary method for navigating through a hierarchy of nodes stored in a database.

FIG. 3 is a flow diagram of an exemplary computer-implemented method 300 for navigating through a hierarchy of nodes stored in a database. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a request to access a database that stores a hierarchy of nodes that is divided into contiguous subsections, the database storing each subsection on a separate page. For example, receiving module 104 may, as part of computing device 202 in FIG. 2, receive request 210 to access database 120 that stores contiguous subsections of set of nodes 130 on pages 208.

The term "contiguous subsection," as used herein, generally refers to any portion, chunk, or grouping of nodes that are linked or connected such that every node within the subsection may be navigated to by traversing through one or more adjacent parent and/or child nodes in the subsection. In addition, the term "page," as used herein, generally refers to any type or form of storage partition, section of memory, data object, and/or data structure that stores a pre-defined amount of data.

The systems described herein may identify the request to access the database in a variety of ways. In some examples, receiving module 104 may identify a request to modify one or more nodes within set of nodes 130 within database 120. As another example, receiving module 104 may determine that request 210 includes a request to add one or more new nodes to set of nodes 130. Additionally or alternatively, receiving module 104 may determine that request 210 includes a request to delete one or more nodes from set of nodes 130. Furthermore, receiving module 104 may determine that request 210 includes a request to add, remove, and/or switch the dependencies (e.g., child and parent associations) between one or more nodes within set of nodes 130.

In other examples, receiving module 104 may determine that request 210 includes a request to identify nodes linked by certain relationships within database 120. For example, receiving module 104 may determine that request 210 includes a request to identify the highest parent node of a particular child node, a request to identify all child nodes that depend from a particular parent node, a request to identify all nodes within a particular level within the hierarchy, and/or any other type of request that may involve accessing multiple nodes. As will be discussed in greater detail below, fulfilling such requests may include traversing a path through set of nodes 130.

Set of nodes 130 may be divided into contiguous subsections in a variety of ways. In examples where the systems described herein are responsible for managing and/or maintaining set of nodes 130 within database 120, dividing module 108 may divide set of nodes 130 into contiguous subsections at least in part by allocating a number of nodes to each subsection. In some examples, dividing module 108 may allocate a predetermined number of nodes (e.g., 2000 nodes) to each subsection. In other examples, dividing module 108 may analyze a variety of factors in order to determine an optimal number of nodes per page that minimizes the time and computing resources required to traverse a path within set of nodes 130. For example, accessing nodes loaded into local memory may be faster and more resource-efficient than accessing nodes from external storage (e.g., from storage system 206). Accordingly, dividing module 108 may maximize the number of nodes simultaneously loaded into local memory while balancing the time and resources required to manage and retrieve large pages within database 120. As such, dividing module 108 may allocate the number of nodes to each subsection based on the number of nodes within set of nodes 130, the amount of time required to load a page into local memory, and/or any additional factor.

Furthermore, in some examples, the systems described herein may dynamically update the number of nodes stored within a page as set of nodes 130 is modified. For example, storing module 110 may delete, add, and/or rearrange one or more nodes stored within pages 208 (e.g., in response to receiving request 210). In some examples, after storing a subsection of nodes in a page, storing module 110 may add additional nodes to the page until the number of nodes within the pages reaches a predetermined threshold. In response to the number of nodes reaching the predetermined threshold, storing module 110 may separate the page into two pages that each contain a contiguous subsection of nodes (e.g., in order to maintain pages of approximately equal size). Therefore, dividing module 108 may determine the number of nodes originally allocated to each subsection based at least in part on the frequency with which nodes within set of nodes 130 are modified.

Database 120 and/or pages 208 may store a variety of information associated with set of nodes 130 and/or pages 208. For example, in addition to storing the value of each node, database 120 may store a primary key that uniquely identifies each node. Similarly, dividing module 108 may assign each page and/or identify within each page a page key that uniquely identifies the page. Database 120 may store the page key of each of pages 208, as well as a record of each node within each page.

Furthermore, database 120 may store associations between nodes and one or more parent and/or child nodes directly linked to the nodes. As such, traversing module 106 may navigate to multiple nodes in a path within the same page. In addition, as will be explained in greater detail below, database 120 and/or pages 208 may store associations between parent and child nodes that enable traversing module 106 to navigate to nodes that are stored on subsequent pages. For example, each node in a page may store the page key of any pages that contain child nodes of the node, as well as the name of the root node of the child pages. In addition, in some examples, storing module 110 may store, within one or more of pages 208, the page keys of the pages that contain a parent node of the root node within the page. The term "root node," as used herein, generally refers to any parent node that represents the highest level of a hierarchy. A root node may represent the highest parent node of an entire set of nodes and/or the highest parent node within a single page. In some examples, each page may contain a single root node. As such, each page may have a single parent node on a separate page that is the parent node of the root node.

Figure 4:
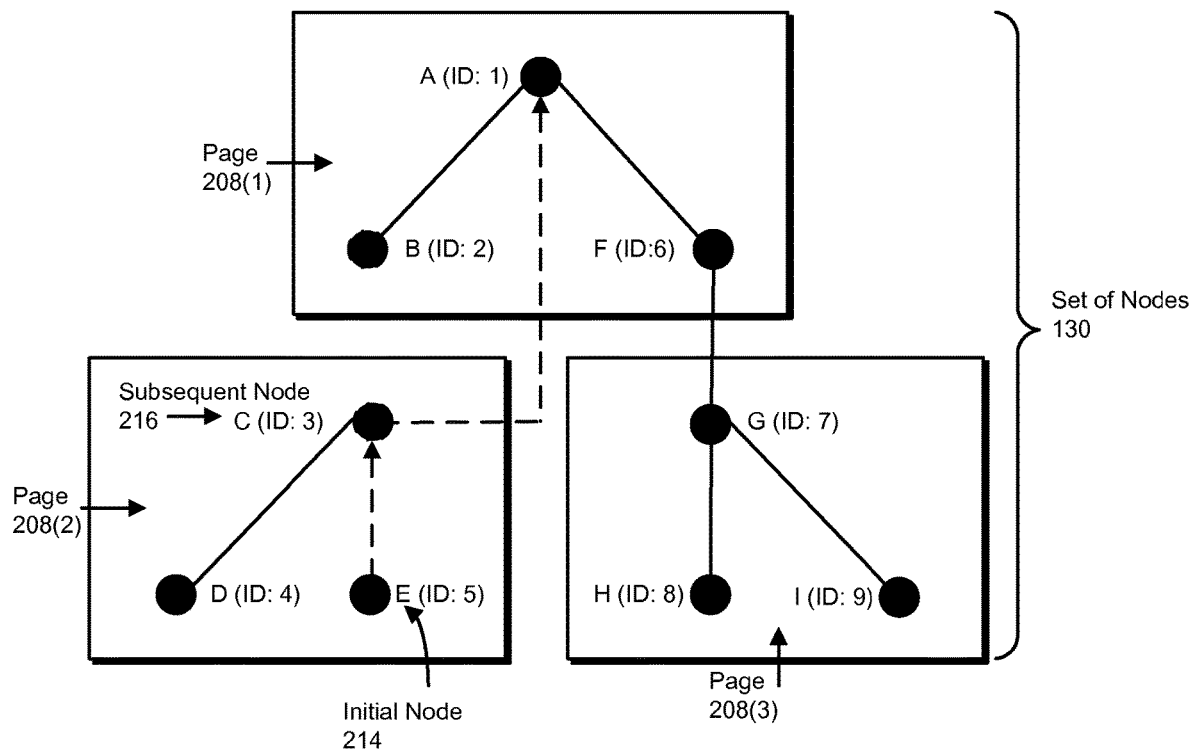
FIG. 4 is an illustration of an exemplary hierarchy of nodes stored in separate pages.

As an example of a set of nodes stored in separate pages, FIG. 4 illustrates set of nodes 130 divided across pages 208(1)-(3). As shown in FIG. 4, set of nodes 130 may include nodes A-I, with node A representing the root node of the hierarchy. Also as shown in FIG. 4, nodes A, B, and F may be stored within page 208(1), nodes C, D, and E may be stored within page 208(2), and nodes G, H, and I may be stored within page 208(3). In this example, nodes A-I may be identified by primary keys 1-9 ("IDs" 1-9, as shown in FIG. 4) respectively. In addition, pages 208(1)-(3) may be represented by page keys 1, 2, and 3.

Returning to FIG. 3, at step 304, one or more of the systems described herein may, in response to the request, traverse a path through the hierarchy of nodes by (a) identifying an initial node in the path and looking up an initial page that contains the initial node, (b) loading the page from the database into local memory, the page including the initial node in the path and one or more subsequent nodes in the path, and (c) navigating to the subsequent nodes in the path by accessing the page loaded into local memory instead of accessing the database. For example, traversing module 106 may, as part of computing device 202 in FIG. 2, traverse a path through set of nodes 130 by (a) identifying initial node 214 and looking up initial page 212 that contains initial node 214, (b) loading initial page 212 from database 120 into local memory, and (c) navigating to subsequent node 216 in the path by accessing initial page 212 via local memory instead of accessing database 120.

The term "path," as used herein, generally refers to any sequence or series of steps between adjacent nodes (e.g., parent, sibling, and/or child nodes). In some examples, a path may be traversed up a hierarchy of nodes (e.g., the last node of the path may be stored within a higher level of the hierarchy than the initial node). In other examples, a path may be traversed down a hierarchy of nodes (e.g., the last node of the path may be stored within a lower level of the hierarchy than the initial node).

The systems described herein may identify the initial node in the path in a variety of ways. Traversing module 106 may identify the initial node using a name, value, or other identifying information from the request. In some embodiments, traversing module 106 may identify initial node 214 by identifying the primary key that uniquely identifies initial node 214 (e.g., rather than identifying the name and/or value of initial node 214). In some examples, traversing module 106 may identify the primary key of initial node 214 within request 210. For example, traversing module 106 may determine that request 210 includes a request to identify each child node that descends from initial node 214. In this example, traversing module 106 may traverse a path down set of nodes 130. In another example, traversing module 106 may determine that request 210 includes a request to identify the root node that initial node 214 is descended from and/or to identify each node in the path between the root node and initial node 214. In this example, traversing module 106 may traverse a path up set of nodes 130.

Referring to the example of FIG. 4, traversing module 106 may determine that node E represents initial node 214. In this example, traversing module 106 may determine that request 210 specifies node E as initial node 214 and/or that request 210 includes a request to identify each parent node that node E descends from. In addition to and/or instead of identifying the name of node E, traversing module 106 may identify the primary key of node E. As an example of how primary keys may be stored, FIG. 5 illustrates a lookup table 500. As shown in FIG. 5, lookup table 500 may store the primary keys of nodes A-I (e.g., set of nodes 130 as described in FIG. 4) and the page key of the page that contains each node.

Once traversing module 106 identifies initial node 214, traversing module 106 may look up initial page 212 that contains initial node 214. For example, traversing module 106 may look up the page key of initial page 212 using the primary key of initial node 214. Referring to the example of FIG. 5, traversing module 106 may determine, based on lookup table 500, that node E is stored within the page assigned page key 2.

After identifying the page key of initial page 212, traversing module 106 may load initial page 212 into local memory. For example, traversing module 106 may retrieve and/or request initial page 212 from storage system 206. Traversing module 106 may then load initial page 212 into a cache or local memory within computing device 202. In some examples, storage system 206 may compress the contents of initial page 212 (e.g., by serializing each node within initial page 212 into a single field within a page table). In these examples, traversing module 106 may expand (e.g., by de-serializing the field within the page table) initial page 212 in order to access and/or read each node in initial page 212. In general, traversing module 106 may load initial page 212 into local memory in any way such that each node within initial page 212 may be accessed without requiring an additional trip to storage system 206.

Referring to the example of FIG. 4, traversing module 106 may load page 208(2) into local memory within computing device 202. Traversing module 106 may then access and/or identify node E within page 208(2). Next, traversing module 106 may navigate to subsequent node 216 within page 208(2). For example, traversing module 106 may determine that request 210 includes a request to find each parent node of node E, and therefore traversing module 106 may identify node C as subsequent node 216 based on identifying node C as the parent node of node E (e.g., by identifying information stored within node E). Traversing module 106 may then access node C within local memory. In this example, node C may represent the last node within the path that is stored within initial page 212. However, in other examples, initial page 212 may contain additional subsequent nodes (e.g., hundreds or thousands of subsequent nodes). In these examples, traversing module 106 may continue to navigate to each subsequent node within initial page 212.

In some examples, while traversing the path through set of nodes 130, traversing module 106 may determine that the subsequent node in the path is stored on a subsequent page (e.g., subsequent page 218 in FIG. 2). For example, traversing module 106 may determine that the path contains the parent node of the root node of initial page 212 and/or a child node of the lowest child node within initial page 212. In response to determining that the subsequent node in the path is stored on a subsequent page, traversing module 106 may navigate to the subsequent node by loading subsequent page 218 into local memory.

In some examples, traversing module 106 may traverse a path up set of nodes 130 by identifying subsequent parent nodes (e.g., as in the example of FIG. 4). While traversing the path up set of nodes 130, traversing module 106 may determine that the subsequent parent node is stored on subsequent page 218. In these examples, traversing module 106 may identify subsequent page 218 and load subsequent page 218 into local memory by first identifying the primary key of the subsequent node within a page table that, for each of pages 208, stores a record of the nodes within each page and the primary key of the parent node of the root node of the page. The term "page table," as used herein, generally refers to any type of form of database or lookup table that stores associations between pages, the nodes within pages, and the parent nodes of pages. As an example, FIG. 5 illustrates a page table 502. In this example, page table 502 may represent a page table for nodes A-I illustrated in FIG. 4. As shown in FIG. 5, page table 502 may store associations between (1) page key 2 and primary key 1 and (2) page key 3 and primary key 6. In addition, page table 502 may store a compressed or serialized version of the portion of the hierarchy of nodes within each page. In this example, traversing module 106 may use page table 502 to determine that the primary key of the subsequent node is 1. Although illustrated as separate tables, in some examples, the information stored within lookup table 500 and page table 502 may be combined into a single table.

Once traversing module 106 identifies the primary key of the subsequent node, traversing module 106 may use the primary key of the subsequent node to look up the page key of the page that stores the subsequent node. In the example of FIGS. 4 and 5, traversing module 106 may use lookup table 500 to determine that the page key of subsequent page 218 is 1.

As previously mentioned, in some embodiments, each of pages 208 may store the page key of the parent node of the page. For example, referring to FIG. 4, page 208(3) may store page key 1 to indicate that the parent node of node G is stored within page 208(1). In addition, page 208(2) may store page key 1 to indicate that the parent node of node C is stored within page 208(1). As such, when traversing a path up the hierarchy of nodes, traversing module 106 may directly identify the page key of subsequent page 218 within initial page 212. This optimization may reduce or even eliminate the need to access a lookup table and/or a page table, therefore decreasing the time and computing resources required to load the subsequent page into local memory.

In some examples, in response to request 210, traversing module 106 may traverse a path down set of nodes 130 by identifying subsequent child nodes. While traversing the path down set of nodes 130, traversing module 106 may determine that the subsequent child node is stored on subsequent page 218. In these examples, traversing module 106 may identify subsequent page 218 and load subsequent page 218 into local memory by directly identifying information that indicates subsequent page 218 within pages 208 (e.g., within a page table that stores a serialized version of pages 208). For example, as previously described, each of the lowest parent nodes within pages 208 may store the page key of the page that stores the subsequent child node. In addition, each of the lowest parent nodes may store the name of the subsequent child node (e.g., the root node of the subsequent child page) to enable efficient traversal to the child node. As an example, node F in FIG. 4 may store page key 3 and node G to indicate that node G is a child node of node F and is stored within page 208(3). In this way, traversing module 106 may directly identify the page key of the page that contains the subsequent child node, as well as the name of the subsequent child node, without requiring a lookup table and/or a page table.

Once traversing module 106 identifies the page key of subsequent page 218, traversing module 106 may load subsequent page 218 into local memory. In some examples, traversing module 106 may then continue to traverse the path within subsequent page 218 in local memory. In the example of FIG. 4, node A may represent the last node within the path. However, in other examples, traversing module 106 may continue to identify subsequent nodes and/or subsequent pages within the path.

In some examples, loading one or more of pages 208 from storage system 206 into local memory may represent the most time and resource intensive step of traversing a path through set of nodes 130. As such, the systems described herein may simultaneously store multiple pages in local memory to reduce latency times incurred while retrieving subsequent pages. For example, after loading a subsequent page into local memory, traversing module 106 may cache (e.g., may continue to store both) the subsequent page and initial page 212 in local memory. In this way, traversing module 106 may more quickly fulfill requests that involve traversing back and forth between two or more pages and/or fulfill multiple requests involving nodes distributed across the same set of pages.

Additionally, in some examples, traversing module 106 may pre-emptively load at least one additional page that potentially stores nodes within a path into local memory. For example, while identifying or navigating through initial page 212, traversing module 106 may identify one or more pages (e.g., by analyzing page keys and/or associations stored within a page table) that contain nodes closely related to the nodes within initial page 212. Traversing module 106 may then load the additional pages into local memory (e.g., while loading initial page 212 into local memory). By predicting pages that may contain nodes within the path, traversing module 106 may access nodes within subsequent pages via local memory.

Notably, in some examples, traversing module 106 may traverse a path through hierarchy of nodes 130 that includes nodes distributed across multiple servers. For example, one or more subsequent pages that contains nodes within the path may be stored on separate servers within storage system 206. Referring to the example of FIG. 4, each of pages 208(1)-(3) may be stored within and loaded into local memory from different servers. As such, the systems described herein may reduce the need for communication between multiple servers, therefore decreasing the overall time required to traverse a path through set of nodes 130.

The systems described herein may be implemented in a variety of ways and provide a number of advantages. As explained above, by loading sections of a hierarchy of nodes from a database into local memory, the systems and methods described herein may quickly and efficiently access multiple nodes within local memory, rather than individually retrieving each subsequent node from a server that stores the database. As such, the disclosed systems and methods may reduce the time and computing resources required to traverse a path through a set of nodes.

Figure 6:
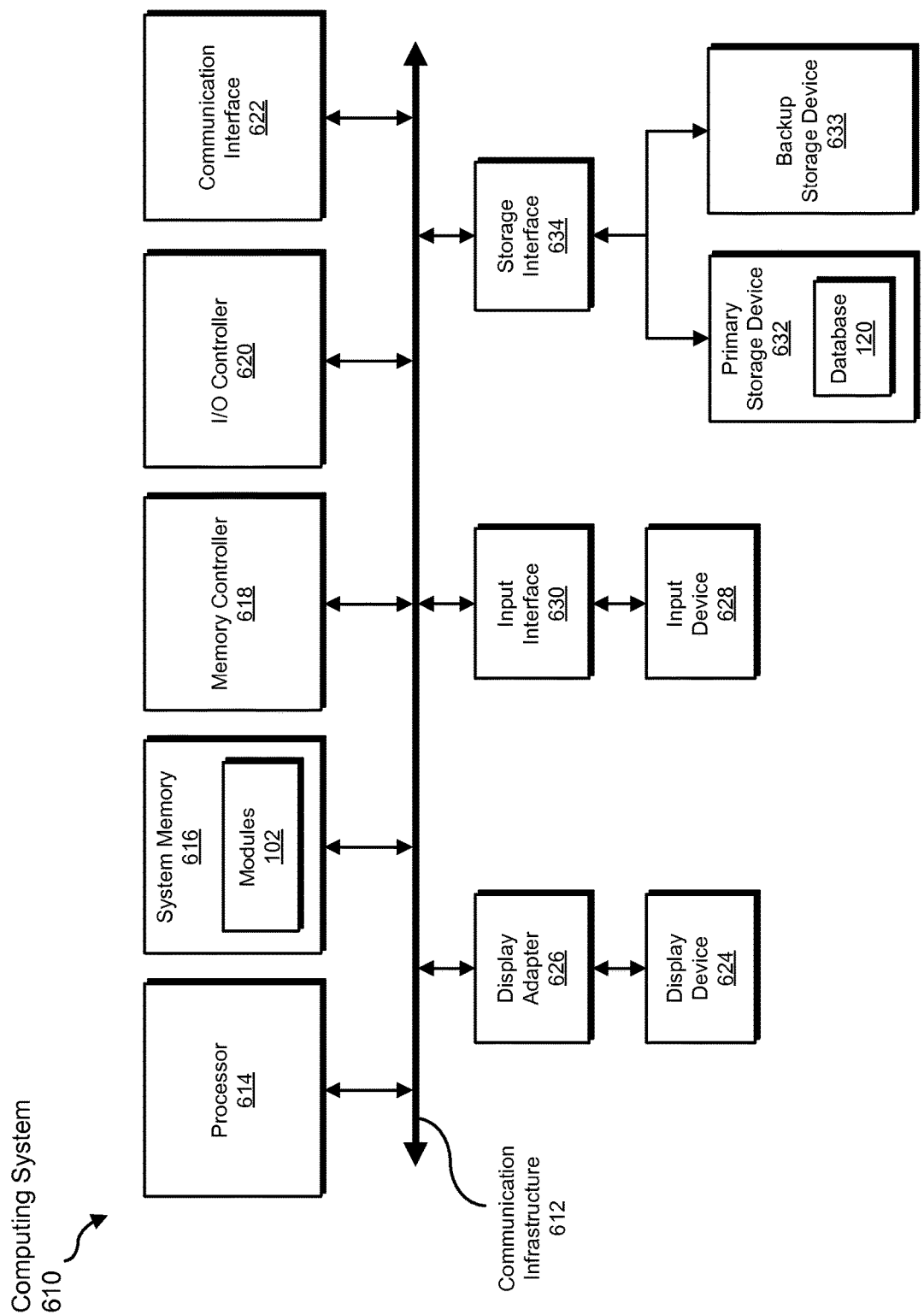
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
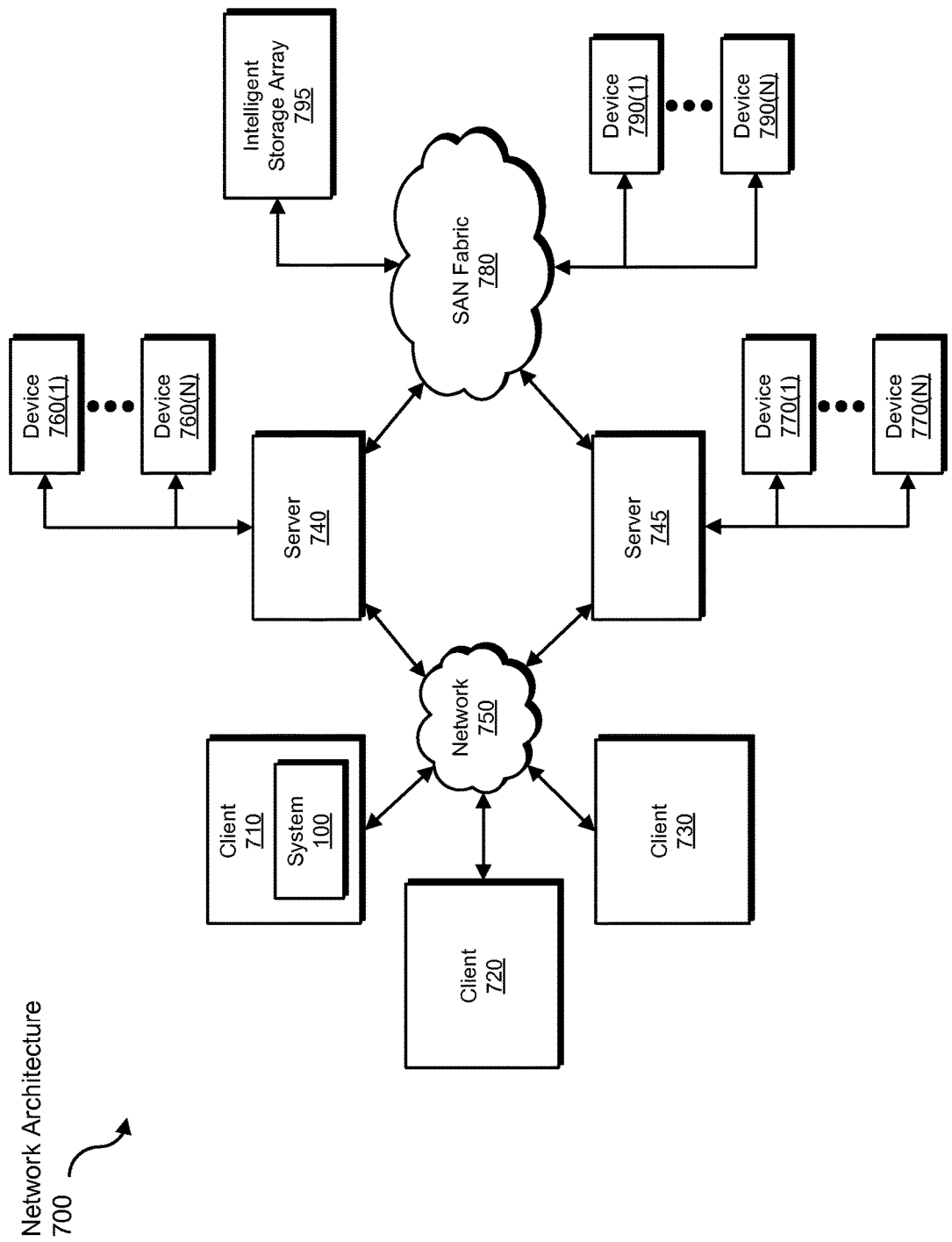
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for navigating through a hierarchy of nodes stored in a database.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to access a set of nodes, transform the request into a path traversed through the set of nodes, and use the result of the transformation to navigate the path through the nodes. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for navigating through a hierarchy of nodes stored in a database, at least a portion of the method being performed by a computing device comprising at least one processor, the method comprising:
dividing a set of nodes organized in a hierarchy into contiguous subsections by:
selecting a number of nodes to allocate to each subsection based at least in part on an amount of time involved in loading the number of nodes into local memory from a database;
storing each subsection in a separate page within the database, wherein each node in the hierarchy represents at least one of: a child node descended from a parent node, a parent node with at least one child node, or a root node that represents a highest parent node on a path within a page, and each node within the hierarchy is uniquely identified by a primary key; and
storing within each node at least one association between the node and each related parent node, child node, or root node by storing within the node the primary key of each related node;
receiving a request to access nodes within the database;
in response to the request, traversing a path through the hierarchy of nodes by:
identifying an initial node in the path and looking up an initial page that contains the initial node and one or more subsequent nodes in the path;
loading the initial page from the database into local memory such that each node contained in the initial page is accessible via local memory;
compressing contents of the initial page by serializing each node within the initial page into a single field within a page table;
navigating to the one or more subsequent nodes in the path by accessing the nodes loaded into local memory instead of accessing the database; and
storing a page key of a subsequent page within at least one of a root node within the initial page or a lowest node on the path within the initial page.

2. The method of claim 1, wherein the path comprises nodes distributed across multiple servers.

3. The method of claim 1, wherein selecting the number of nodes to allocate to each subsection is based further on at least one of:
a total number of nodes within the hierarchy of nodes; and
a frequency with which nodes within the hierarchy of nodes are modified.

4. The method of claim 1, wherein:
each page that stores a subsection of nodes is uniquely identified by a separate page key.

5. The method of claim 4, further comprising:
while traversing the path through the hierarchy of nodes, determining that the one or more subsequent nodes in the path is stored on the subsequent page; and
navigating to the one or more subsequent nodes by loading the subsequent page into local memory.

6. The method of claim 5, wherein:
each parent node that has a child node on a separate page stores the page key of the page that stores the child node;
traversing the path through the hierarchy of nodes comprises traversing a path down the hierarchy of nodes; and
loading the subsequent page into local memory comprises identifying, within the lowest node on the path within the initial page, the page key of the subsequent page.

7. The method of claim 5, wherein:
traversing the path through the hierarchy of nodes comprises traversing a path up the hierarchy of nodes; and
loading the subsequent page into local memory comprises:
identifying the primary key of the one or more subsequent nodes within the root node of the page that, for each page, stores the primary key of the parent node of the root node of the page; and
using the primary key of the one or more subsequent nodes to look up the page key of the subsequent page.

8. The method of claim 5, wherein storing the page key of the subsequent page within the initial page further comprises:

traversing the path through the hierarchy of nodes comprises traversing a path up the hierarchy of nodes; and
loading the subsequent page into local memory comprises directly identifying the page key of the subsequent page within the initial page.

9. The method of claim 5, further comprising, after loading the subsequent page into local memory, caching both the initial page and the subsequent page in local memory.

10. The method of claim 1, wherein loading the initial page from the database into local memory comprises loading the initial page and preloading at least one additional page that potentially stores nodes within the path into local memory.

11. The method of claim 1, further comprising:
adding additional nodes to the initial page until a number of nodes within the initial page reaches a predetermined threshold; and
in response to the number of nodes reaching the predetermined threshold, separating the initial page into two pages that each contain a contiguous subsection of nodes.

12. A system for navigating through a hierarchy of nodes stored in a database, the system comprising at least one processor, wherein the processor is configured to:
divide a set of nodes organized in a hierarchy into contiguous subsections by:
selecting a number of nodes to allocate to each subsection based at least in part on an amount of time involved in loading the number of nodes into local memory from a database;
storing each subsection in a separate page within the database, wherein each node in the hierarchy represents at least one of: a child node descended from a parent node, a parent node with at least one child node, or a root node that represents a highest parent node within a path within a page, and each node within the hierarchy is uniquely identified by a primary key; and
storing within each node at least one association between the node and each related parent node, child node, or root node by storing within the node the primary key of each related node;
receive a request to access nodes within the database;
in response to the request, traverse a path through the hierarchy of nodes by:
identifying an initial node in the path and looking up an initial page that contains the initial node and one or more subsequent nodes in the path;
loading the initial page from the database into local memory such that each node contained in the initial page is accessible via local memory;
compressing contents of the initial page by serializing each node within the initial page into a single field within a page table;
navigating to the one or more subsequent nodes in the path by accessing the nodes loaded into local memory instead of accessing the database; and
store a page key of a subsequent page within at least one of a root node within the initial page or a lowest node on the path within the initial page.

13. The system of claim 12, wherein the path comprises nodes distributed across multiple servers.

14. The system of claim 12, wherein selecting the number of nodes to allocate to each subsection is based further on at least one of:

a total number of nodes within the hierarchy of nodes; and
a frequency with which nodes within the hierarchy of nodes are modified.

15. The system of claim 12, wherein:
each page that stores a subsection of nodes is uniquely identified by a separate page key.

16. The system of claim 15, wherein the processor is further configured to:
while traversing the path through the hierarchy of nodes, determine that the one or more subsequent nodes in the path is stored on the subsequent page; and
navigate to the one or more subsequent nodes by loading the subsequent page into local memory.

17. The system of claim 16, wherein:
each parent node that has a child node on a separate page stores the page key of the page that stores the child node;
traversing the path through the hierarchy of nodes comprises traversing a path down the hierarchy of nodes; and
loading the subsequent page into local memory comprises identifying, within the lowest node on the path within the initial page, the page key of the subsequent page.

18. The system of claim 16, wherein:
traversing the path through the hierarchy of nodes comprises traversing a path up the hierarchy of nodes; and
loading the subsequent page into local memory comprises:
identifying the primary key of the one or more subsequent nodes within the root node of the page that, for each page, stores the primary key of the parent node of the root node of the page; and
using the primary key of the one or more subsequent nodes to look up the page key of the subsequent page.

19. The method of claim 16, wherein storing the page key of the subsequent page within the initial page further comprises:
traversing the path through the hierarchy of nodes comprises traversing a path up the hierarchy of nodes; and
loading the subsequent page into local memory comprises directly identifying the page key of the subsequent page within the initial page.

20. A non-transitory computer-readable medium comprising one or more computer-executable instructions that, when executed by at least one processor of a computing device, cause the computing device to:
divide a set of nodes organized in a hierarchy into contiguous subsections by:
selecting a number of nodes to allocate to each subsection based at least in part on an amount of time involved in loading the number of nodes into local memory from a database;
storing each subsection in a separate page within the database, wherein each node in the hierarchy represents at least one of: a child node descended from a parent node, a parent node with at least one child node, or a root node that represents a highest parent node on a path within a page, and each node within the hierarchy is uniquely identified by a primary key; and
storing within each node at least one association between the node and each related parent node, child node, or root node by storing within the node the primary key of each related node;
receive a request to access nodes within the database;
in response to the request, traverse a path through the hierarchy of nodes by:

identifying an initial node in the path and looking up an initial page that contains the initial node and one or more subsequent nodes in the path;

loading the initial page from the database into local memory such that each node contained in the initial page is accessible via local memory;

compressing contents of the initial page by serializing each node within the initial page into a single field within a page table;

navigating to the one or more subsequent nodes in the path by accessing the nodes loaded into local memory instead of accessing the database; and store a page key of a subsequent page within at least one of a root node within the initial page or a lowest node on the path within the initial page.

* * * * *